May 15, 1962 R. B. CHAPIN 3,034,731
BACK FLOW PREVENTING VALVE ASSEMBLY
Filed March 4, 1959
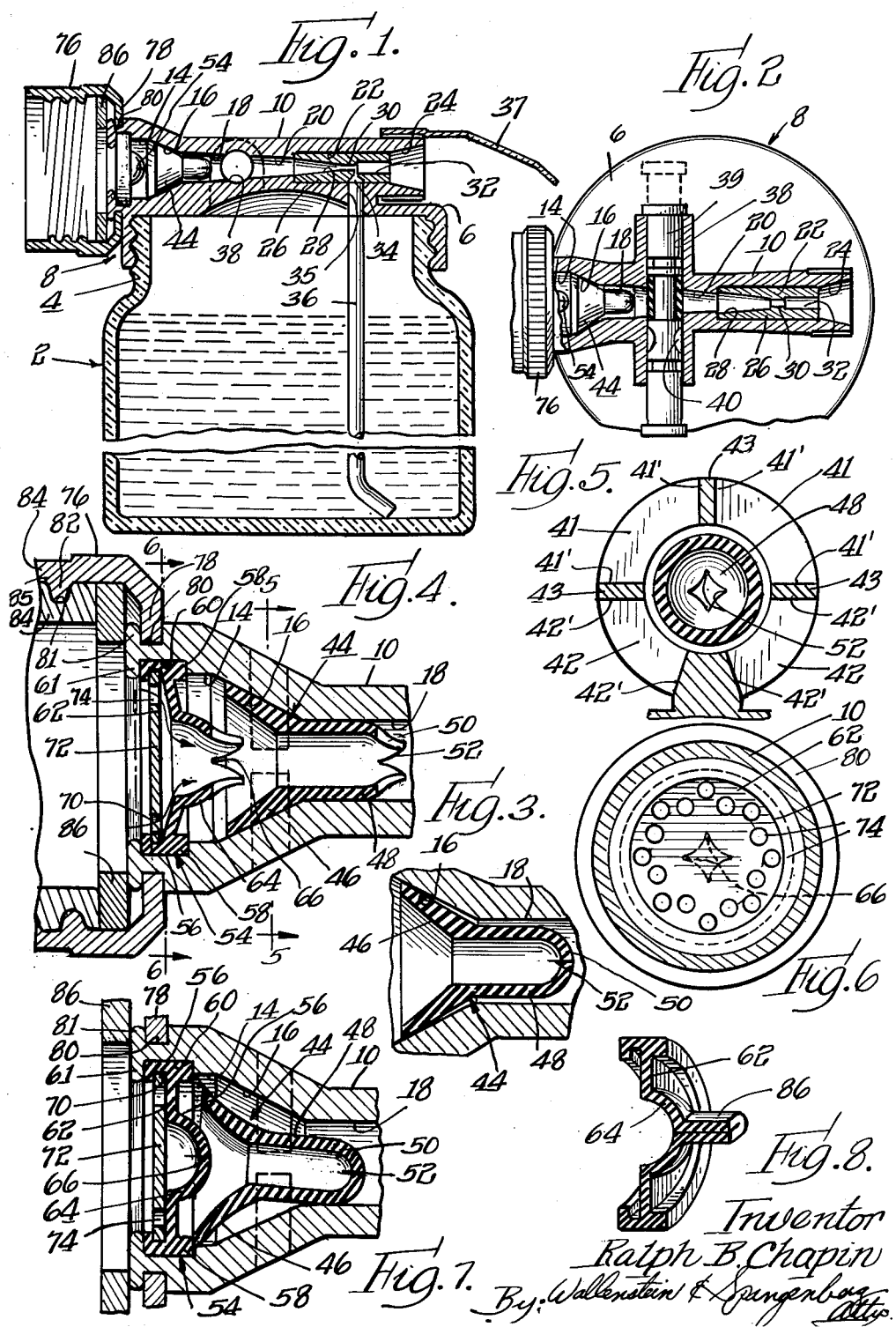
Inventor
Ralph B. Chapin

United States Patent Office 3,034,731
Patented May 15, 1962

3,034,731
BACK FLOW PREVENTING VALVE ASSEMBLY
Ralph B. Chapin, Batavia, N.Y., assignor to R. E. Chapin Manufacturing Works, Inc., Batavia, N.Y., a corporation of New York
Filed Mar. 4, 1959, Ser. No. 797,164
12 Claims. (Cl. 239—318)

This invention relates to apparatus for preventing back flow of fluids in a conduit by valve and/or vacuum-breaking action, and is particularly advantageous when incorporated in a garden spray device of the type which is attachable to a water hose and to a jar or other container holding a garden chemical in liquid form and, by Venturi action, draws the garden chemical from the container into the stream of water passing therethrough from the water hose with a fairly constant proportion of chemical to water maintained over wide variations in water pressure.

It is common to incorporate back flow preventing apparatus in water-dispensing devices leading to contaminated water or other harmful liquids and which are connected directly to public water systems which furnish water for drinking and cooking purposes. This apparatus prevents the sucking of these harmful liquids into the public water system due to low pressure conditions which sometimes develop in the water mains. Such back flow preventing apparatus frequently includes one valve positioned in the inlet end of the water-dispensing device, the valve being open under forward pressure and closed under back pressure. Additionally, such back flow preventing apparatus commonly includes vents located downstream from the back flow preventing valve which vents are covered during forward pressure by a longitudinally flexible diaphragm or a radially expandable valve member secured in place within the fluid passageway involved, and are uncovered under back pressure by the resultant collapse of the diaphragm or valve member to break any low pressure or vacuum conditions which may cause initial leaking of the undesired liquid past the back flow preventing valve in the absence of such vacuum-breaking means. Obviously, this back flow preventing apparatus should be exceedingly reliable, have a long service life and be free from maintenance problems. Also, the flexible diaphragm or radially expandable valve member which covers the vacuum-breaking vents should be quick acting since slow action thereof (often found particularly in the case of the aforesaid flexible diaphragm) results in the momentary escape of water through the vents when the water is initially turned on. Moreover, in the case where the back flow preventing apparatus is used in a garden chemical spraying device where a fairly constant proportion of the garden chemical to the water with varying water pressure is desired, the back flow preventing valve should not be pressure sensitive.

A still further problem is caused by the fact that many municipalities place very stringent requirements on the back flow preventing apparatus. They, for example, sometimes require that the vacuum-breaking vents prevent back flow of fluid under given low pressure conditions at the inlet to the device involved even in the absence of the back flow preventing valve.

It is, accordingly, an object of the present invention to provide improved back flow preventing apparatus which is reliable, has a long service life, and is substantially free of maintenance problems.

Another object of the invention is to provide back flow preventing apparatus as just described which will operate in the manner described above even when the dimensions of various parts thereof are made to wide tolerances.

A further object of the invention is to provide back flow preventing apparatus as just described wherein a vent covering member is provided which is fast acting under forward pressure to prevent any significant leakage of water through the vents and is operative under back pressure substantially completely to uncover the vents which are effective to prevent back flow by vacuum-breaking action under fairly low inlet pressures even when the back flow valve used therewith is defective.

In accordance with one aspect of the present invention, the vacuum-breaking portion of the back flow preventing apparatus comprises a hollow member positioned in the main fluid passageway of a fluid dispensing device so as to float freely between the vacuum-breaking vents and a stop shoulder or backing means located upstream from the vents. The hollow member is moved by the forward pressure of fluid into a forward position where it covers the vacuum breaking vents and is moved rearwardly against the backing means by back pressure to uncover substantially completely the vacuum-breaking vents. The portion of the main fluid passageway in which the vacuum breaking vents are formed is most advantageously tapered toward the outlet end thereof. The hollow member is externally tapered to make a wedging fit with the defining walls of this tapered portion of the passageway, with this arrangement, the hollow member will effectively cover the vents in the tapered portion of the passageway for a wide range of tolerances between the hollow body member and the tapered portion of the passageway. The fact that the hollow member is a freely floating member enables the member to move almost instantaneously under forward pressure to cover the vents and to move rearwardly with similar speed to substantially uncover the vents during back pressure by the force of atmospheric pressure applied, in part, through the vents. This floating hollow member provides a simpler, less expensive and more reliable means for covering and uncovering the vacuum breaking vents than the aforesaid longitudinally flexible diaphragm or radially expandable valve member heretofore used.

In accordance with another aspect of the invention, a number of circumferentially elongated vents are provided which occupy most of the circumferential extent of the passageway forming body involved. To this end, the ends of each vent extend radially outwardly to provide an outwardly flaring vent. This vent design provides a greatly improved vacuum-breaking action so that no back flow of fluid occurs under rather severe low pressure conditions, even when the back flow preventing valve is defective or even removed entirely.

In accordance with a preferred form of the invention, the floating hollow member is provided with a forwardly extending nipple valve portion which opens under forward pressure to allow passage of fluid therethrough and closes under relatively small back pressures which may not unseat the same to uncover the vents, even when vacuum-breaking action is absent. Also, in accordance with a preferred form of the invention, a back flow preventing valve member is located upstream from the hollow body member, such member most advantageously being incorporated in or associated with the aforesaid backing means which limits the rearward movement of the hollow member. Thus, both the vacuum-breaking action afforded by the floating hollow body member and the design of the vents and the back flow preventing valve member located upstream of the vents cooperate to prevent back flow under the most severe vacuum conditions.

Other objects, advantages and features of the invention will become apparent upon making reference to the specification to follow, the claims and drawings wherein:

FIG. 1 is a longitudinal vertical sectional view of a garden chemical sprayer connectable to a water hose coupling and incorporating the back flow preventing apparatus of the present invention, the sprayer being shown in its water-off condition;

FIG. 2 is a longitudinal horizontal section view of the sprayer of FIG. 1;

FIG. 3 is an enlarged fragmentary horizontal sectional view of the sprayer in FIG. 1, showing the floating hollow member therein;

FIG. 4 is an enlarged fragmentary longitudinal sectional view of the portion of the sprayer including the back flow preventing apparatus of the invention with water flowing therethrough under forward pressure;

FIG. 5 is a transverse sectional view through the portion of the spraying device shown in FIG. 4, taken along section line 5—5 therein and looking in the direction of the arrows;

FIG. 6 is a transverse sectional view through the portion of the spraying device shown in FIG. 4, taken along section line 6—6 therein and looking in the direction of the arrows;

FIG. 7 is a view corresponding to FIG. 4 showing the condition of the back flow preventing apparatus under vacuum or back pressure conditions; and FIG. 8 is a cut-away perspective view of a modified back flow-preventing valve useable in the spraying device of FIGS. 1–7.

Referring now to the drawings, FIG. 1 illustrates a garden chemical sprayer including a glass jar 2 containing an insecticide, fertilizer or other garden chemical in liquid form. The jar has an open top defined by an externally threaded neck 4 around which is threaded an internally threaded cap body portion 6 of an integral cap and nozzle piece 8 made of cast metal or other suitable material. The cap and nozzle piece 8 has a nozzle body portion 10 on top of the cap body portion 6 which nozzle body portion is provided with a longitudinal passageway therein. The longitudinal passageway includes a generally cylindrical inlet section 14 joining a forwardly, relatively sharply tapering portion 16, a cylindrical portion 18, and a relatively long, gradually tapering portion 20 opening onto a larger cylindrical portion 22. The cylindrical passageway portion 22 terminates in an outwardly flaring outlet passageway portion 24.

A metering element 26 is press-fitted or otherwise secured within the cylindrical passageway portion 22, the metering element having a passageway with a tapered inlet 28 and a relatively short cylindrical section 30 terminating in a longer slightly larger cylindrical section 32. At the juncture between the cylindrical passageway sections 30 and 32 is a funnel-shaped transverse bore 34 which communicates with a vertical opening 35 formed in the cap body portion 6 of the cap and nozzle piece 8. A tube 36 is press-fitted or otherwise secured within the opening 35 and extends into the bottom of the jar 2.

A deflecting member 37 is attached to the outlet end of the nozzle body portion 10 to deflect and fan out the discharged fluid leaving the sprayer.

The nozzle body portion 10 has a transverse spool valve bore 38 which intersects the tapered portion 20 of the nozzle passageway, and the transverse bore contains a manually operable, spool type control valve 39 projecting beyond the ends of the spool valve bore and slidable therein into one extreme position illustrated in FIG. 1 where the nozzle passageway is blocked, and into the opposite extreme position shown in dotted lines therein where the nozzle passageway is open for forward flow of water. The spool control valve is provided with an annular groove 40 which provides a space communicating between the sections of the nozzle passageway intersected by the spool control valve when the latter is in its passageway-opening position.

In accordance with one aspect of the present invention, there is formed in the defining walls of the tapered portion 16 of the nozzle passageway a pair of upper vents 41—41 and a pair of lower vents 42—42. These vents are each circumferentially elongated and have outwardly flaring ends 41'—41' or 42'—42'. With this outwardly flaring vent construction, the vents can be made to occupy a near maximum circumferential extent so as to obtain maximum vacuum-breaking action for vents of a given width. Of course, the ribs of metal 43 between the vents must be sufficiently strong to withstand the abuse which is reasonably anticipated. The length of the lower vents 42—42 are preferably shorter than the upper vents 41—41 for reasons to be explained.

A hollow vent covering member 44 is positioned for free floating movement in the tapered portion 16 of the nozzle passageway. The hollow member 44 has a relatively wide inner end or base portion 46 having the shape of a frustrum of a cone both externally and internally to provide forwardly tapering outer and inner surfaces, and a forwardly extending nipple portion 48 having a curved end wall 50 provided with centered intersecting slits 52. The forwardly tapering external surface of the base portion 46 is adapted to make a wedging fit with the vent containing tapered passageway portion 16 under the forward pressure of fluid flowing to the right as viewed in the drawings. The taper thereof is preferably greater (e.g. one degree or greater) than that of the tapered passageway portion 16 to prevent the hollow member from becoming fixedly wedged in the passageway.

A back flow preventing valve unit generally indicated by reference numeral 54 is located in the cylindrical inlet portion 14 of the nozzle passageway. This valve unit comprises a valve body 56 made of a flexible resilient material, such as rubber or the like, which has a cylindrically shaped peripheral wall portion 58 nestled within a counterbore 60 at the rear end of the inlet passageway portion 14. The peripheral wall portion 58 of the valve body 56 is held in liquid sealing relation with the defining walls of the counterbore 60 by a downwardly turned lip 61 formed at the inner end of the nozzle body portion 10 of the cap and nozzle piece 8 after the valve body member has been inserted in the counterbore 60, the lip being formed by any suitable furling operation. An annular imperforate wall portion 62 extends radially inwardly from the peripheral portion 58 of the valve body 56 and terminates in a forwardly curving wall portion 64 provided with centered intersecting slits 66. A flat, rigid, backing disc 72 made of metal or similar material is resiliently held within an internal annular channel 70 in the peripheral wall portion 58 behind the inwardly extending imperforate wall portion 62 of the valve body. A series of holes 74 are formed in the peripheral portion of the disc 72 opposite the imperforate inwardly extending wall portion 62 of the valve body 56 which, in the absence of normal forward water pressure, seals the holes 74.

A hose nozzle coupling 76 is provided having an inwardly extending end wall portion 78 rotatably mounted around a reduced portion 80 at the inner end of the nozzle body portion 10 of the cap and nozzle piece 8, which inner end projects beyond the cap portion 6. The coupling 76 is held on the reduced portion 80 by an upwardly extending lip 81 formed after the hose coupling is applied around the reduced portion 80 by any suitable furling or peening operation. The lips 61 and 81 are shown in transverse alignment, so that they can be formed in a single peening or furling operation. The hose coupling 76 has the usual internal threads 82 adapted to be threaded around an externally threaded portion 83 (FIG. 4) of a complementary fitting 84 secured to the end of a water hose and a washer 86 is press-fitted within the hose coupling.

The operation of the sprayer is as follows: When the hose coupling 76 has been fastened to the complementary hose fitting 84 and the water turned on, the inwardly extending imperforate wall portion 62 of the valve body 56 flexes forwardly, thereby providing clearance for passage of water through the disc holes 74 into the forwardly curving wall portion 64 of the valve body 56. The water pressure also flexes the flaps provided by the cross slits 66—66 forwardly as illustrated in FIG. 4 to provide a relatively large water passage opening allowing water to flow toward and into the hollow member 44, the forward pressure of the water forcing the tapered walls of the hollow member into sealing engagement with the vented tapered nozzle passageway portion 16 to seal off the vents 41—41 and 42—42, and expanding the nipple portion 48. The water pressure deflects the flaps formed by the cross slits 52—52 forwardly to provide a large opening for passage of water. The aforesaid flaps formed by the cross slits 66—66 and 52—52 are so flexible that they deflect readily under even relatively low pressure into the axial positions shown to provide wide open exitways for the water.

When the spool valve 39 is open, after leaving the hollow member 44, the water flows through the annular space 40 of the spool valve 39 and then through the metering element 26 where, by Venturi action, the garden chemical is sucked through the tube 36 and into the throat of the metering element where it is entrained by the forwardly moving body of water moving therethrough. As the water moves out of the nozzle passageway, it is deflected by the deflecting member 37.

If for any reason a vacuum or low pressure condition occurs in the water main of the water system with which the sprayer device is connected while the spool valve 39 is open, the resulting back pressure will, in most cases, force the hollow member 46 rearwardly against the valve body 56 of the back flow preventing valve unit 54 which acts as a stop shoulder or backing means, to uncover substantially completely the vacuum-breaking vents. The back pressure also forces the imperforate inwardly extending wall portion of the valve body 56 against the perforated portion of the backing disc 72 to seal the holes 74 thereof and prevent back flow of fluid into the hose nozzle 76. The size of the space between the back flow preventing valve unit 54 and the throat of the tapered nozzle passageway portion 16 is sufficiently small that the hollow member 46 cannot turn around therein.

The aforesaid back pressure is effected, in part, by atmospheric pressure applied through the vents 41—41 and 42—42. Except, perhaps, for very small back pressures, the conical external surface of the base portion of the hollow member 44 is readily unseated from the tapered portion 16 of the nozzle passageway. This is aided in part by the fact that this conical surface has a sharper taper than the tapered passageway portion 16 and also by the fact that the upper vents 41—41 are longer than the lower vents which results in unbalanced forces tending to tilt the hollow member 44.

In the embodiment of the invention just described, the slitted end portions of the hollow member 46 and the valve body 56 do not by themselves provide substantial back flow preventing action for large back pressures, although they do aid in this regard. In any case where the back pressure is so small that the hollow member remains wedged in the tapered passageway portion 16, the slitted wall portions 48 and 64 provide highly effective back flow action. In accordance with a broader aspect of the invention, it should be understood that the wall portions 48 and 64 of the hollow member 44 and the valve body 56 could be permanently open so that all the back flow preventing action is effected by the uncovered vents 41—41 and 42—42 and the covering of the disc holes 74 by the radially inwardly extending portion 62 of the valve body 56.

In accordance with a still further modified form of the invention illustrated in FIG. 8, the forwardly curving wall portion 64 of the valve body 56 is modified to include a longitudinally slitted, axially-extending portion 86 forming a beer check valve. This forms a highly effective back flow valve which finds its most practical use in applications not requiring the mixing in a constant proportion with varying pressures of two liquids, because the beer check valve is somewhat pressure sensitive in providing an opening whose size varies with pressure. The embodiment provided by the aforesaid slits 52 is not so pressure sensitive because the flaps formed thereby are readily flexed outwardly to their fullest extent by even small pressures. This is not so with the beer check type of valve.

The present invention thus provides an exceedingly simple and inexpensive back flow preventing valve construction including a unique freely floating vacuum-breaking vent uncovering member 44 which, due to its shape, construction and placement effectively seals off the vent openings quickly under forward pressure, and just as quickly uncovers the same under back pressure, and without requiring close tolerances in the dimensions thereof. Also, the unique construction of the vacuum breaking vents provides improved vacuum-breaking action.

It should be understood that numerous modifications may be made of the preferred forms of the invention above described without deviating from the broader aspects of the invention.

What I claim as new and desire to protect by Letters Patent of the United States is:

1. In a garden spray device including a conduit defining a main water-conveying passageway with a Venturi throat and a side inlet through which a given proportion of a garden chemical is drawn by the pressure drop created by said Venturi throat, the proportion to remain substantially constant over a wide range of water pressures, vent means in said conduit upstream from said Venturi throat for venting the same to atmospheric pressure, the improvement in apparatus for preventing back flow of water in said passageway comprising: a back flow preventing valve having a water-conveying opening which is fully open even under low water pressures which are at the bottom of said range of pressures and which is closed under back pressure, and a member buoyant in water and free to float bodily in said passageway between a downstream position under forward pressure to close said vent means and an upstream position under back pressure to uncover said vent means.

2. In a fluid-conveying conduit forming an enclosed passageway having a fluid inlet end and a fluid outlet end, apparatus for preventing back-flow of fluid in the conduit passageway comprising: vent means in the walls of said conduit which vent the conduit to atmospheric pressure, a hollow member buoyant in said fluid and free to float bodily in said passageway between a downstream position where it covers said vent means and an upstream position where it uncovers said vent means, said hollow member providing a passageway for flow of fluid therethrough when fluid is forced under forward pressure toward said outlet end of the conduit passageway, said forward pressure forcing said hollow member into said downstream position, said hollow member being forced into said upstream position by back pressure, and valve means on the upstream side of said vent means which closes under said back pressure for preventing back flow of said fluid in said conduit and opens under said forward pressure to allow forward passage of the fluid in said conduit.

3. In a fluid-conveying conduit forming an enclosed passageway having a fluid inlet end and a fluid outlet end and a tapered portion therebetween which tapers toward the outlet end of the conduit, apparatus for preventing back-flow of fluid in the conduit passageway comprising: vent means in the walls of said conduit forming said tapered passageway portion which vent means vents the conduit to atmospheric pressure, and a hollow member which is externally tapered to make a wedging fit with said tapered vented passageway portion, said hollow member being buoyant in said fluid and free to float bodily in said passageway between a downstream position, where the externally tapered portion thereof is wedged in the tapered portion of said conduit passageway and covers said vent means, and an upstream position where it uncovers said vent means, said hollow member providing a passageway for flow of fluid therethrough when fluid is forced under forward pressure toward said outlet end of the conduit passageway, said forward pressure forcing said hollow member into said downstream position, said hollow member being forced into said upstream position by back pressure, and valve means on the upstream side of said vent means which valve means closes under said back pressure for preventing back flow of said fluid in said conduit and opens under said forward pressure to allow forward passage of the fluid in said conduit.

4. In a fluid-conveying conduit forming an enclosed passageway having a fluid inlet end and a fluid outlet end, apparatus for preventing back-flow of fluid in the conduit passageway comprising: vent means in the walls of said conduit which vent the conduit to atmospheric pressure, a hollow member buoyant in said fluid and free to float bodily in said passageway between a downstream position where it covers said vent means and an upstream position where it uncovers said vent means, said hollow member providing a passageway for flow of fluid therethrough when fluid is forced under forward pressure toward said outlet end of the conduit passageway, said forward pressure forcing said hollow member into said downstream position, and also forming a valve inhibiting back flow of fluid through the conduit under relatively small back pressures which do not unseat the hollow member from said upsteam position.

5. In a fluid-conveying conduit forming an enclosed passageway having a fluid inlet end and a fluid outlet end and a tapered portion therebetween which tapers toward the outlet end of the conduit, apparatus for preventing back-flow of fluid in the conduit passageway comprising: vent means in the walls of said conduit forming said tapered passageway portion which vent means vents the conduit to atmospheric pressure, a hollow member which is externally tapered to make a wedging fit with said tapered vented passageway portion and positioned in the conduit passageway to move between a downstream position, where the externally tapered portion thereof is wedged in the tapered portion of said conduit and covers said vent means, and an upstream position where it uncovers said vent means, said hollow member having readily flexible valve lips which are substantially fully open for even relatively low forward pressures, for providing a passageway for flow of fluid therethrough when fluid is forced under forward pressure toward said outlet end of the conduit passageway, said forward pressure forcing said hollow member into said downstream position, and also forming a closed valve inhibiting back flow of fluid through the conduit under small back pressure which is insufficient to unseat the hollow member from the tapered passageway portion, said hollow member being unseated from said tapered passageway portion and moved into said upstream position by high back pressure.

6. In a garden sprayer for mixing a garden chemical into a stream of water, the sprayer including a nozzle body having a longitudinal passageway having a water inlet end and a water outlet end and a Venturi throat therebetween, a transverse opening at said Venturi throat which transverse opening communicates with said passageway and through which said garden chemical is drawn into said passageway by Venturi action, said passageway having vent means in said nozzle body communicating with said passageway upstream from said Venturi throat for venting said passageway to atmospheric pressure, the improvement comprising apparatus for preventing back flow of water in said nozzle passageway comprising: a back flow preventing valve positioned in said passageway upstream from said vent means, and a member in said passageway buoyant in water and free to float bodily in said passageway between a position upstream from said vent means where said vent means are uncovered and a downstream position where it closes said vent means, said member being forced into said downstream position by forward fluid pressure and into said upstream position by back fluid pressure.

7. In a garden sprayer for mixing a garden chemical into a stream of water, the sprayer including a nozzle body having a longitudinal passageway having a water inlet end and a water outlet end and a Venturi throat therebetween, a transverse opening at said Venturi throat which transverse opening communicates with said passageway and through which said garden chemical is drawn into said passageway by Venturi action, said passageway having a tapered portion upstream from said Venturi throat which tapers toward the outlet end thereof and vent means in said nozzle body at and communicating with said tapered passageway portion for venting said passageway to atmospheric pressure, the improvement comprising apparatus for preventing back flow of water in said nozzle passageway comprising: a back flow preventing valve positioned in said passageway upstream from said tapered passageway portion and a member buoyant in water and free to float bodily in said passageway between a position upstream from said tapered passageway portion where said vent means are uncovered and a position adjacent said vent means, said member including an externally tapered portion adapted to make a wedging fit with said tapered passageway portion to close off said vent means when forward pressure is applied thereto, and to move rearwardly to uncover said vent means when back pressure is applied thereto.

8. In a garden sprayer for mixing a garden chemical into a stream of water, the sprayer including a nozzle body having a longitudinal passageway having a water inlet end and a water outlet end and a Venturi throat therebetween, a transverse opening at said Venturi throat which transverse opening communicates with said passageway and through which said garden chemical is drawn into said passageway by Venturi action, the proportion of garden chemical to water to remain substantially constant over a wide range of water pressures, said passageway having a tapered portion upstream from said Venturi throat which tapers toward the outlet end thereof and vent means in said nozzle body at and communicating with said tapered passageway portion for venting said passageway to atmospheric pressure, the improvement comprising apparatus for preventing back flow of water in said nozzle passageway comprising: a b ck flow preventing valve positioned in said passageway upstream from said tapered passageway portion and which is substantially fully open for even relatively low pressures in said range of pressures, and a member positioned to move between a position upstream from said tapered passageway portion where said vent means are uncovered and a position adjacent said vent means, said member including an externally tapered inner portion adapted to make a wedging fit with said tapered passageway portion to close off said vent means when forward pressure is applied thereto, and to contact said back flow preventing valve to uncover said vent means when back pressure is applied thereto, said member further including a hollow nipple valve portion extending forwardly from said inner portion and having readily flexible valve lips which are substantially fully open for even relatively low forward pressures, for providing an opening through which water passes under forward pressure and a seal inhibiting back flow of fluid therethrough under small back pressures which are insufficient to unseat the member from said tapered passageway portion.

9. In a fluid-conveying conduit forming an enclosed passageway having a fluid inlet end and a fluid outlet end and a tapered portion adjacent the inlet end thereof which tapers toward said outlet end, and vent means in said conduit at and communicating with said tapered passageway portion for venting the passageway to atmospheric pressure, apparatus for preventing back-flow of fluid in said passageway comprising: a back-flow preventing valve positioned at the inlet end of said passageway upstream from said tapered passageway portion and including a valve body of flexible material having a continuous peripheral wall portion, an imperforate intermediate wall portion extending radially inwardly from said peripheral wall portion and a wall portion extending forwardly from the inner end of said intermediate wall portion and providing an opening through which fluid passes under forward pressure and a seal inhibiting back flow of fluid under back pressure, a flat rigid backing disc behind said intermediate wall portion of said valve body and having a perforated portion opposite said intermediate wall portion, the perforations of which form pass-through openings for forward flow of fluid therethrough under forward pressure but which are sealed by said imperforate intermediate wall portions when forced thereagainst by back pressure, and a vent covering member in said passageway buoyant in said fluid and free to float bodily in said passageway between a position upstream from said vent means and a position adjacent to said vent means, said vent covering member including an externally tapered inner portion adapted to make a wedging fit with said tapered passageway portion to close off said vent means when forward pressure is applied thereto, said vent covering member being moved to said upstream position to uncover said vent means when back pressure is applied thereto.

10. In a fluid-conveying conduit forming an enclosed passageway having a fluid inlet end and a fluid outlet end and a tapered portion therebetween which tapers toward the otulet end of the conduit, means for preventing back-flow of fluid in the conduit passageway, said means including vent openings formed in the portion of said conduit forming said tapered passageway portion, which openings vent the conduit passageway to atmospheric pressure, and a vent covering member made of a flexible material externally tapered to a greater degree than said tapered passageway portion and adapted to make a wedging fit with said tapered passageway portion, said vent covering member being positioned in the conduit passageway to move under forward fluid pressure to a downstream positon where the externally tapered portion thereof is wedged in the tapered portion of said passageway and covers said vent openings, and under back pressure to an upstream position where it uncovers said vent openings, said vent covering member providing a passageway for flow of fluid therethrough when fluid is forced under forward pressure through the conduit.

11. In a fluid-conveying conduit forming an enclosed passageway having a fluid inlet end and a fluid outlet end and a tapered portion therebetween which tapers toward the outlet end of the conduit, means for preventing back-flow of fluid in the conduit passageway, said means including vent openings formed in the portion of said conduit forming said tapered passageway portion, which openings vent the conduit passageway to atmospheric pressure, and a vent covering member externally tapered to make a wedging fit with said tapered passageway portion, said vent covering member being positioned in the conduit passageway to move under forward fluid pressure to a downstream position where the externally tapered portion thereof is wedged in the tapered portion of said passageway and covers said vent openings, and under back pressure to an upstream position where it uncovers said vent openings, said vent covering member providing a passageway for flow of fluid therethrough when fluid is forced under forward pressure through the conduit, and said vent openings being variously sized to provide unbalanced back pressure forces which tilt said vent covering member to aid in releasing it from its wedging fit with said tapered passageway portion.

12. In a fluid-conveying conduit forming an enclosed passageway having a fluid inlet end and a fluid outlet end and a tapered portion therebetween which tapers toward the outlet end of the conduit, means for preventing back-flow of fluid in the conduit passageway, said means including circumferentially elongated, laterally outwardly flaring and facing vent openings formed in the peripheral portion of said conduit forming said tapered passageway portion, which openings vent the conduit passageway to atmospheric pressure, said vent openings occupying most of the circumferential extent of said conduit, and a vent covering member made of a flexible material externally tapered to a greater degree than said tapered passageway portion and adapted to make a wedging fit with said tapered passageway portion, said vent covering member being positioned in the conduit passageway to move under forward fluid pressure to downstream position where the externally tapered portion thereof is wedged in the tapered portion of said passageway and covers said vent openings, and under back pressure to an upstream position where it uncovers said vent openings, said vent covering member providing a passageway for flow of fluid therethrough when fluid is forced under forward pressure through the conduit.

References Cited in the file of this patent

UNITED STATES PATENTS

| | | |
|---|---|---|
| 1,222,316 | Matthewman | Apr. 10, 1917 |
| 2,322,631 | Groeniger | June 22, 1943 |
| 2,412,760 | Svirsky | Dec. 17, 1946 |
| 2,449,573 | White | Sept. 21, 1948 |
| 2,594,318 | Langdon | Apr. 29, 1952 |
| 2,662,724 | Kravagna | Dec. 15, 1953 |
| 2,675,823 | Langdon | Apr. 20, 1954 |
| 2,738,798 | Goodrie | Mar. 20, 1956 |
| 2,875,776 | Skipwith | Mar. 3, 1959 |
| 2,897,835 | Philippe | Aug. 4, 1959 |